United States Patent
Guercioni

(10) Patent No.: US 9,015,929 B2
(45) Date of Patent: Apr. 28, 2015

(54) APPARATUS AND METHOD FOR INSERTING PREFORMED ELECTRICAL BAR CONDUCTORS IN A TWISTING DEVICE

(75) Inventor: Sante Guercioni, Teramo (IT)

(73) Assignee: Tecnomatic S.p.A., Teramo (IT)

( * ) Notice: Subject to any disclaimer, the term of this patent is extended or adjusted under 35 U.S.C. 154(b) by 0 days.

(21) Appl. No.: 13/387,730

(22) PCT Filed: Jul. 16, 2010

(86) PCT No.: PCT/IT2010/000313
§ 371 (c)(1),
(2), (4) Date: Jan. 28, 2012

(87) PCT Pub. No.: WO2012/007973
PCT Pub. Date: Jan. 19, 2012

(65) Prior Publication Data
US 2013/0115029 A1    May 9, 2013

(51) Int. Cl.
*B23P 19/00*    (2006.01)
*H05K 13/04*    (2006.01)
*B65H 1/00*    (2006.01)
*H02K 15/04*    (2006.01)
*H02K 15/06*    (2006.01)

(52) U.S. Cl.
CPC ........ *H02K 15/0421* (2013.01); *H02K 15/0428* (2013.01); *H02K 15/064* (2013.01)

(58) Field of Classification Search
CPC . H02K 15/0428; H02K 15/0421; H01R 43/20
USPC .................. 29/742, 729; 414/222.04, 225.01, 414/226.01
See application file for complete search history.

(56) References Cited

U.S. PATENT DOCUMENTS 1,853,161 A * 4/1932 Apple ........................... 310/201
4,375,229 A * 3/1983 Mikami et al. ................ 140/102
(Continued)

FOREIGN PATENT DOCUMENTS

GB    1514608    6/1978
GB    2073060    10/1981
(Continued)

OTHER PUBLICATIONS

Chinese Office Action dated Sep. 26, 2014, 6 pages.

*Primary Examiner* — David Angwin
(74) *Attorney, Agent, or Firm* — Tarter Krinsky & Drogin LLP

(57) ABSTRACT

An apparatus for inserting a preformed electrical bar conductor into a twisting device of the conductor, the apparatus comprising: a supply device that arranges the preformed bar conductor into a supply direction (X-X), the preformed bar conductor having two rectilinear arms that are parallel to each other and connected to each other by a curved portion; a transfer device that draws the conductor from the supply device into a grip position in which the conductor is arranged along the supply direction (X-X) and rotates it 90 degrees into an insertion position in which the conductor is arranged along an insertion direction (Y-Y), perpendicular to the supply direction (X-X) and parallel to a pocket on the twisting device; and an insertion device that inserts the conductor into the twisting device, the insertion device equipped with thrust means that move the conductor along the insertion direction (Y-Y) until the conductor is at least partially inserted in the pocket.

16 Claims, 7 Drawing Sheets

(56) References Cited

U.S. PATENT DOCUMENTS

| | | | |
|---|---|---|---|
| 5,913,469 A * | 6/1999 | Suzuki | 226/36 |
| 5,973,434 A * | 10/1999 | Soh et al. | 310/216.003 |
| 6,011,332 A * | 1/2000 | Umeda et al. | 310/58 |
| 6,049,154 A * | 4/2000 | Asao et al. | 310/201 |
| 6,490,785 B1 * | 12/2002 | Kometani | 29/742 |
| 7,005,773 B2 * | 2/2006 | Nakamura | 310/180 |
| 7,480,987 B1 * | 1/2009 | Guercioni | 29/825 |
| 2013/0093281 A1 * | 4/2013 | Savagian et al. | 310/208 |
| 2013/0115029 A1 * | 5/2013 | Guercioni | 414/222.04 |

FOREIGN PATENT DOCUMENTS

| | | |
|---|---|---|
| GB | 2263653 | 8/1993 |
| WO | 2011128919 A1 | 10/2011 |

* cited by examiner

APPARATUS AND METHOD FOR INSERTING PREFORMED ELECTRICAL BAR CONDUCTORS IN A TWISTING DEVICE

CROSS REFERENCE TO RELATED APPLICATIONS

This application is based on International Application No. PCT/IT2010/000313, filed on Jul. 16, 2010, the contents of which are incorporated herein by reference.

The present invention regards an apparatus for inserting preformed electrical bar conductors in a twisting device, in particular for applications on bar windings of electric machines, and the related insertion method.

In particular, the components of electric machines, such as stators and rotors, comprise electrical bar conductors that are suitably covered, e.g. enamelled, with electrically insulating material, and are bent and variously-connected together so as to make so-called bar windings.

Bar windings are known in the art that are made by means of electrical bar conductors having essentially rectangular cross section, where by rectangular it is intended both the square section and the "flat" section, with which it is generally indicated a section of rectangular form in which one of the two sides of the section has smaller size with respect to the other.

The aforesaid electrical bar conductors are usually preformed by means of bending, 'U'-shaped or 'P'-shaped, starting from rectilinear electrical bar conductors, so that they can be suitably inserted in suitable radially aligned pockets made in a twisting device adapted to twist the aforesaid preformed conductors, after insertion. In practice, such twisting device essentially serves for "divaricating" the arms of "U"-shaped or "P"-shaped form in order to ensure that two arms of a same conductor, after having extracted the latter from the twisting device, can be subsequently inserted in the pockets of a stator or rotor core, radially offset from each other by at least one predefined pitch.

It is known in the art to make the preforming of the electrical conductors by means of apparatuses which bend the same, initially supplied in rectilinear bar form, in a manner so as to plastically bend them so they can then be inserted in the aforesaid twisting devices.

The U.S. Pat. No. 7,480,987 describes a method for preforming electrical bar conductors (in such document called "hairpin conductors"). As can be observed, in such document the bending of the rectilinear electrical bar conductors in a "U"-shaped or "P"-shaped form (FIG. 10a and relative description of the U.S. Pat. No. 7,480,987) is such to rotate the orientation of the bar conductor from an initial orientation parallel to the work surface to a final orientation perpendicular to the work surface.

Such rotation of the conductor is useful for the subsequent insertion of the conductor thus bent in the twisting device. Such insertion is for example carried out in accordance with the teachings of the U.S. Pat. No. 7,721,413.

On the other hand, it is desirable to obtain a preforming of the conductor by always working on the same work surface, possible pre-preforming working operations such as the cutting of the conductors from a coil and the peeling of defined and selected portions of the bar conductor ends.

Indeed, in such a manner all of the preforming operations of the conductor are simplified and optimized for precision and speed.

In the apparatuses that carry out all the operations preceding the preforming on the same work surface of the preforming, there is therefore the need to rotate the preformed electrical bar conductors so as to arrange them parallel to the pockets of the twisting devices in which they must be inserted after having been preformed.

The object of the present description is that of providing an apparatus that is such to resolve the drawbacks and/or needs mentioned with reference to the prior art.

Such drawbacks and/or needs are solved by an apparatus as defined in the enclosed claim 1 and by a method as defined in claim 17.

Other embodiments of the present invention are described by the subsequent claims.

Further characteristics and advantages of the present invention will be more comprehensible from the following description reported of preferred, non-limiting embodiments thereof, wherein.

Figure 1:
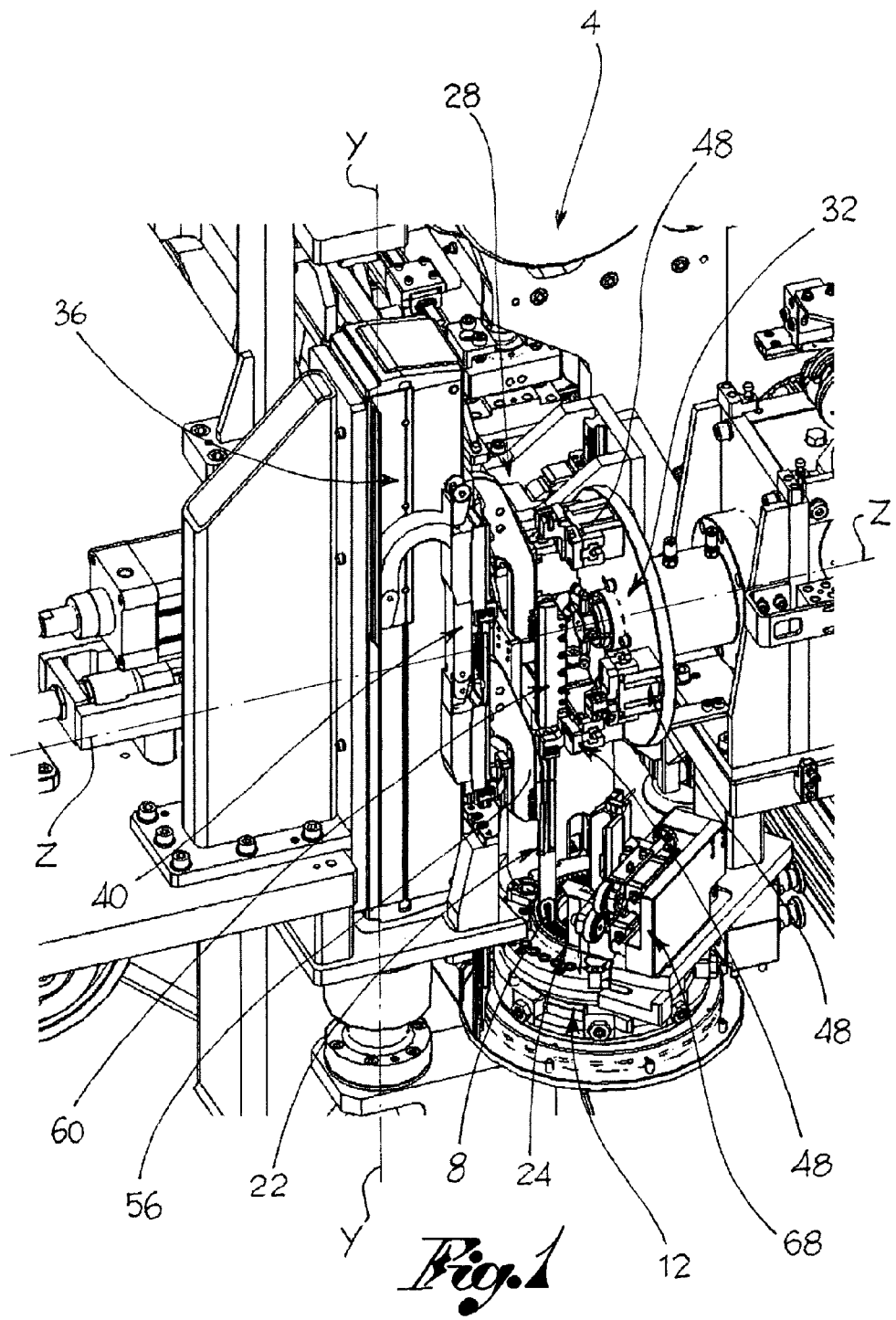
FIG. 1 represents a perspective view of an insertion apparatus in accordance with one embodiment of the present description.
Figure 2:
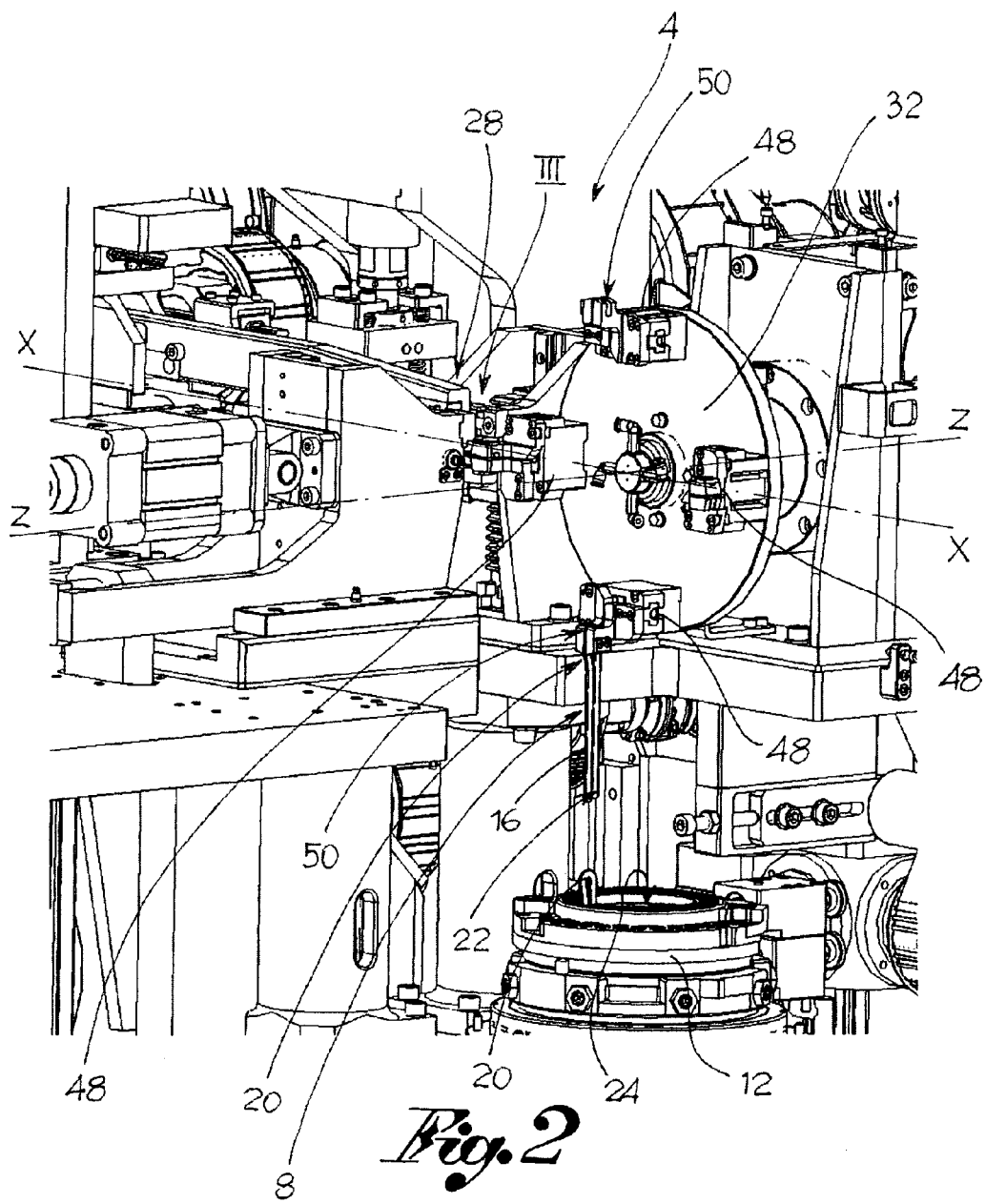
FIG. 2 represents a further perspective view of the apparatus of FIG. 1, from a different angle, in which several elements have been removed to allow the view of particular details of the apparatus.
Figure 3A:
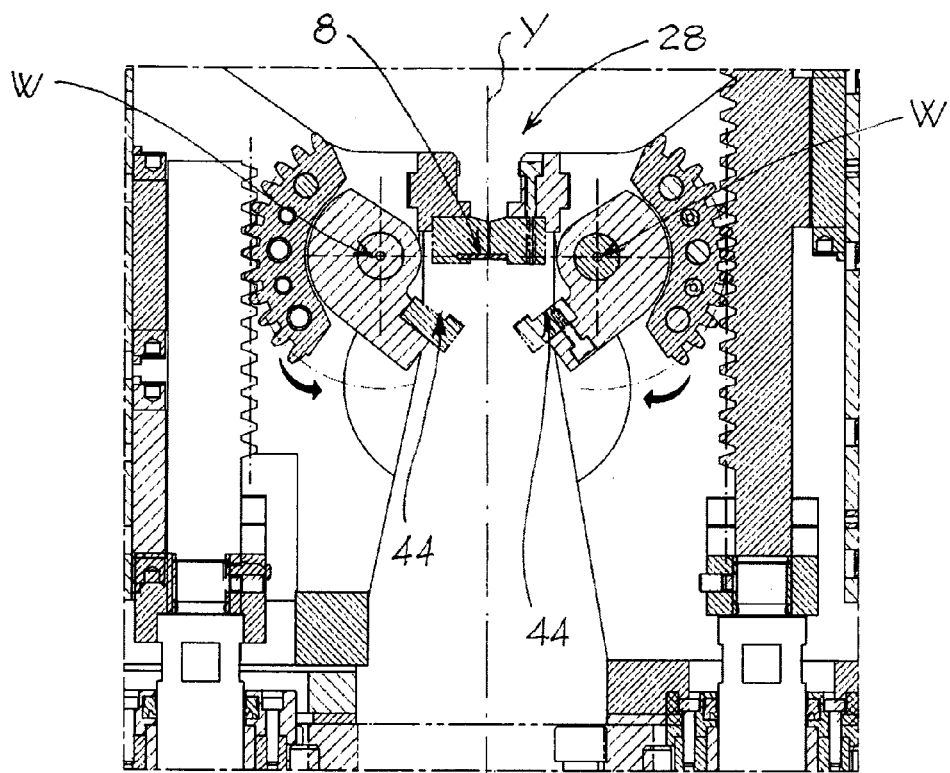
Figure 3B:
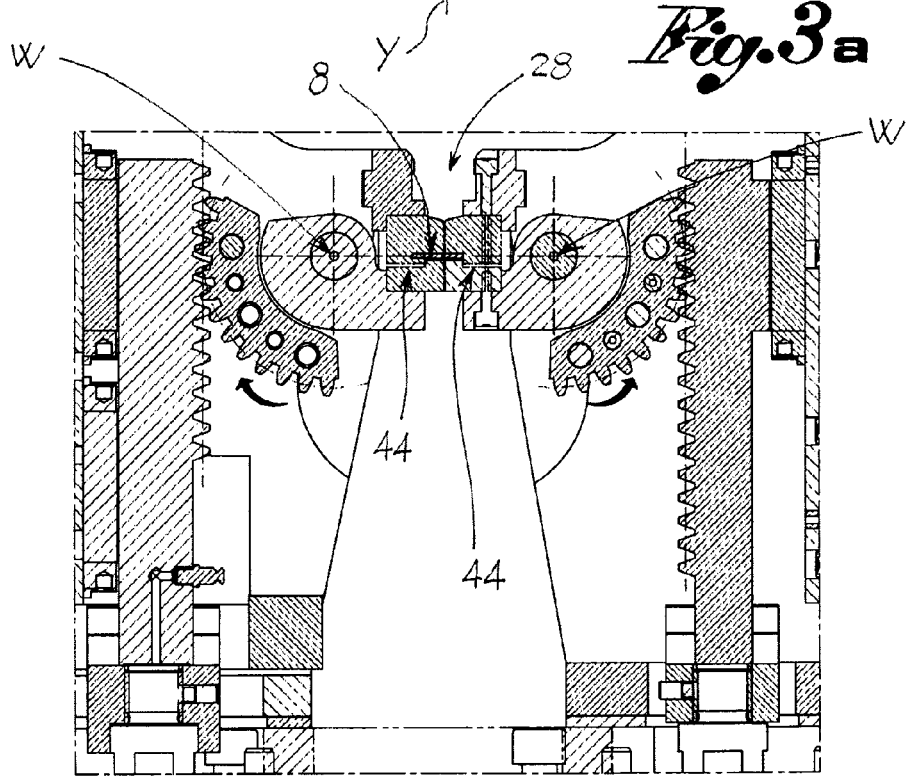
Figure 4:
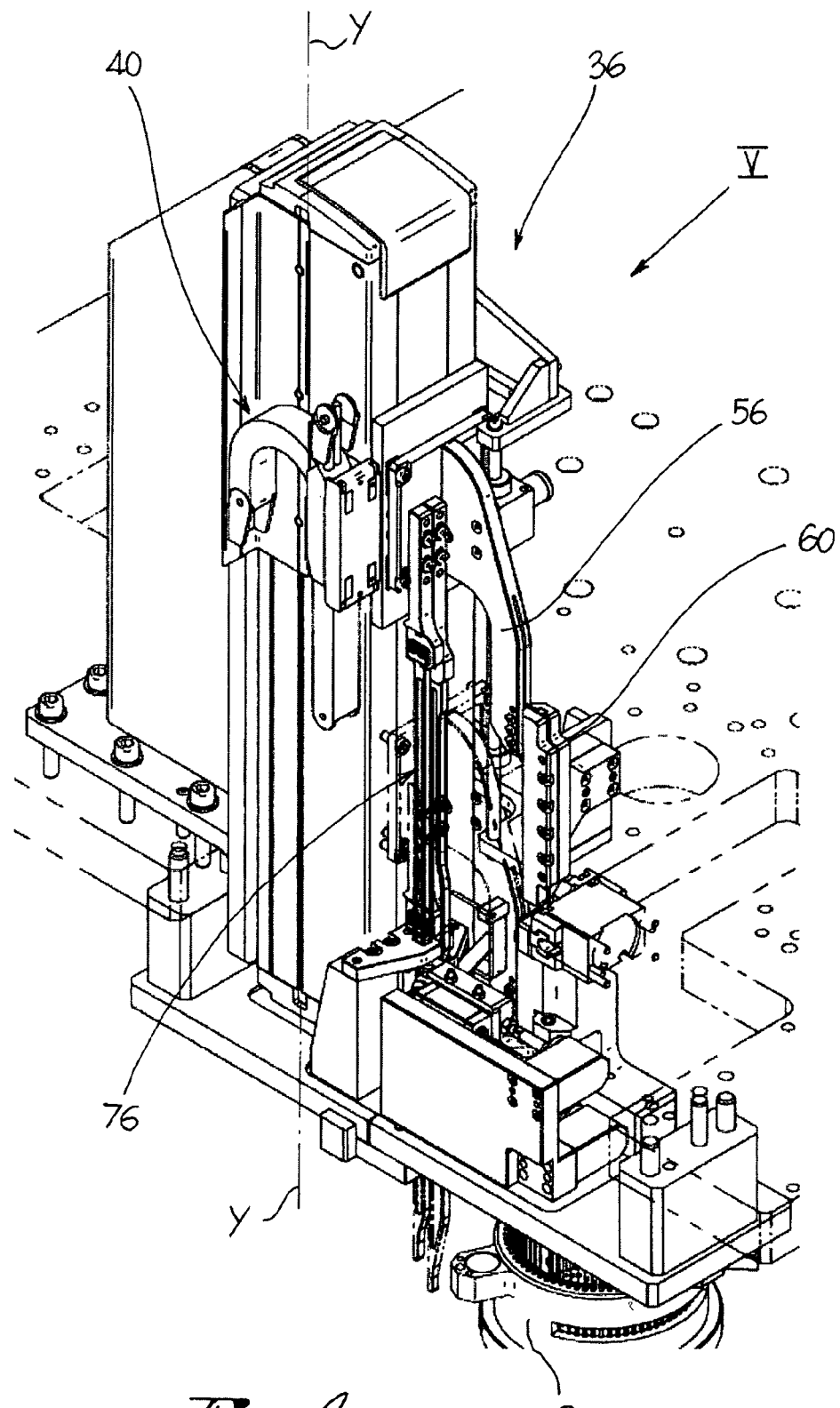
Figure 5:
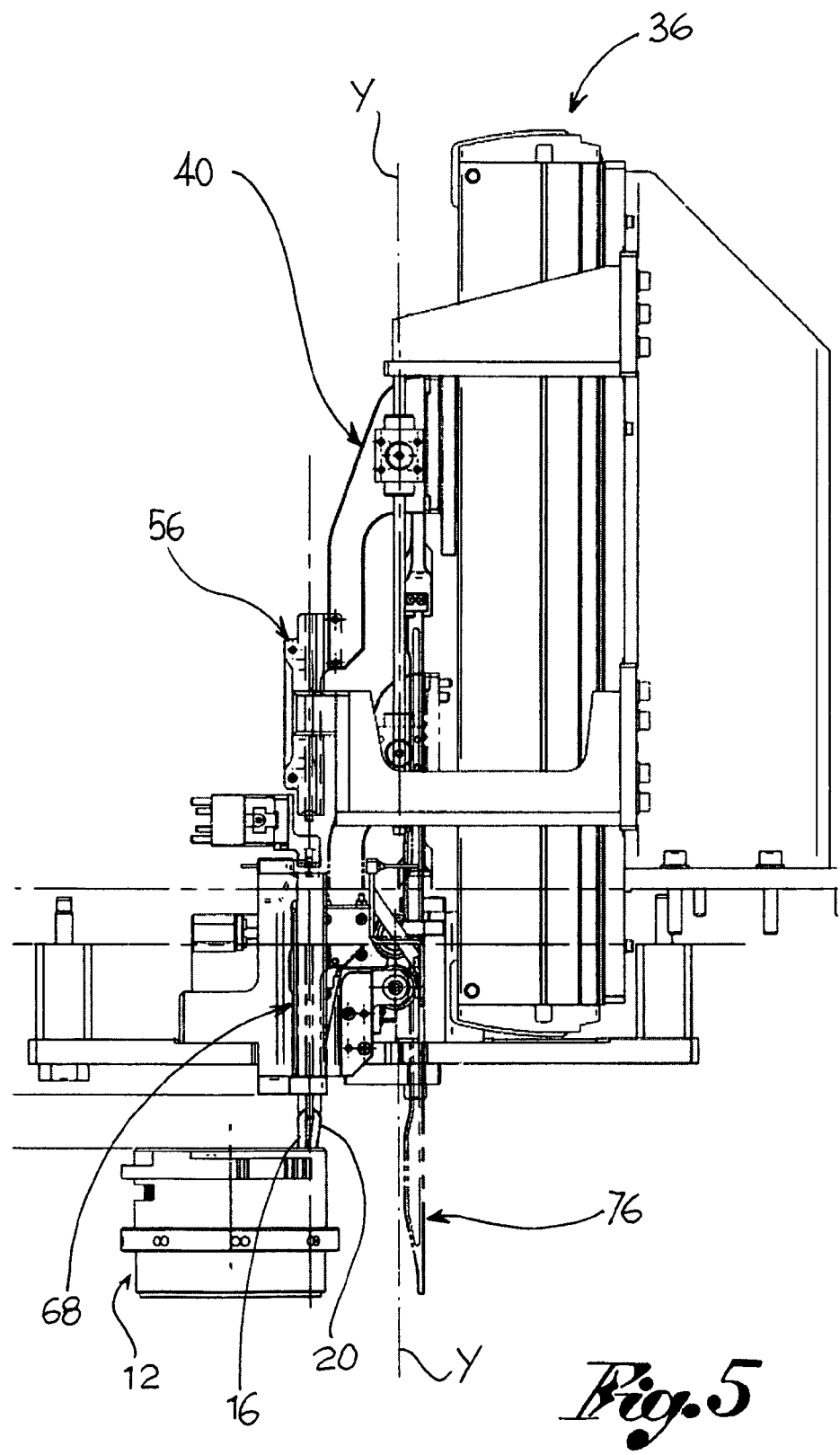
Figure 6:
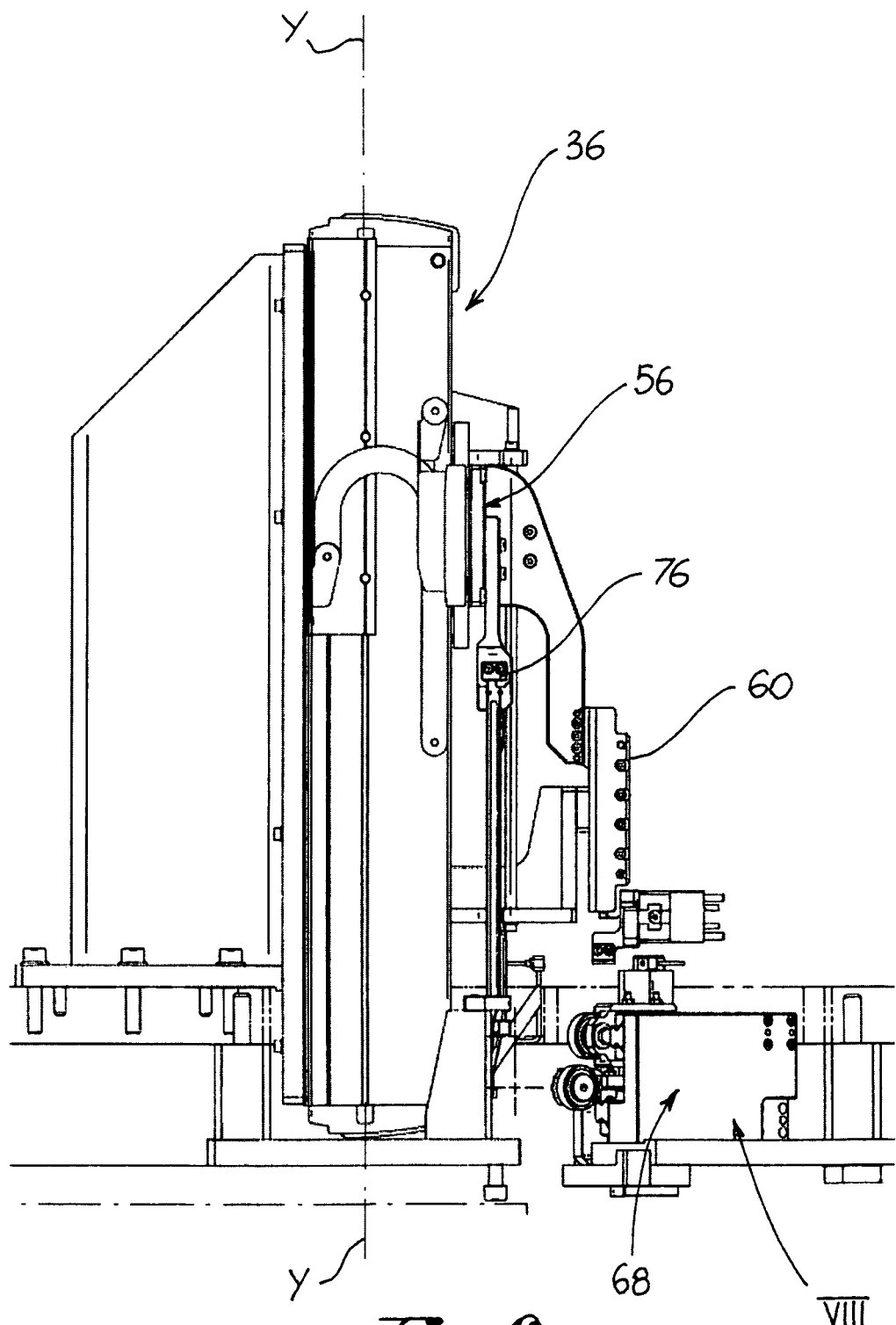
Figure 7:
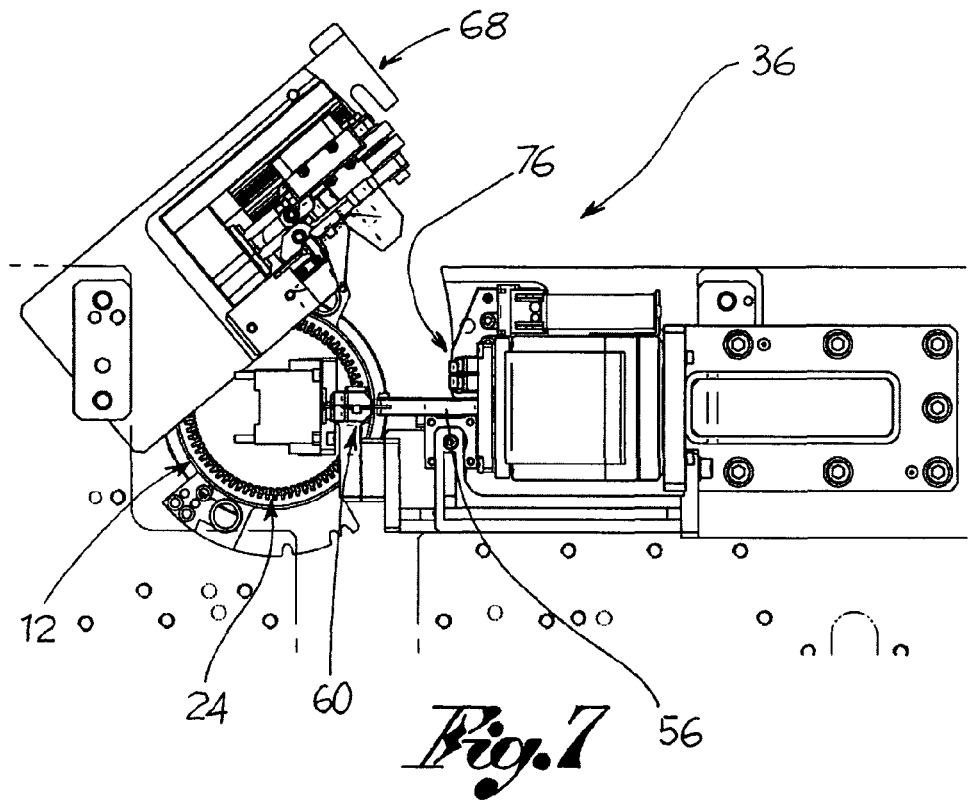
Figure 8:
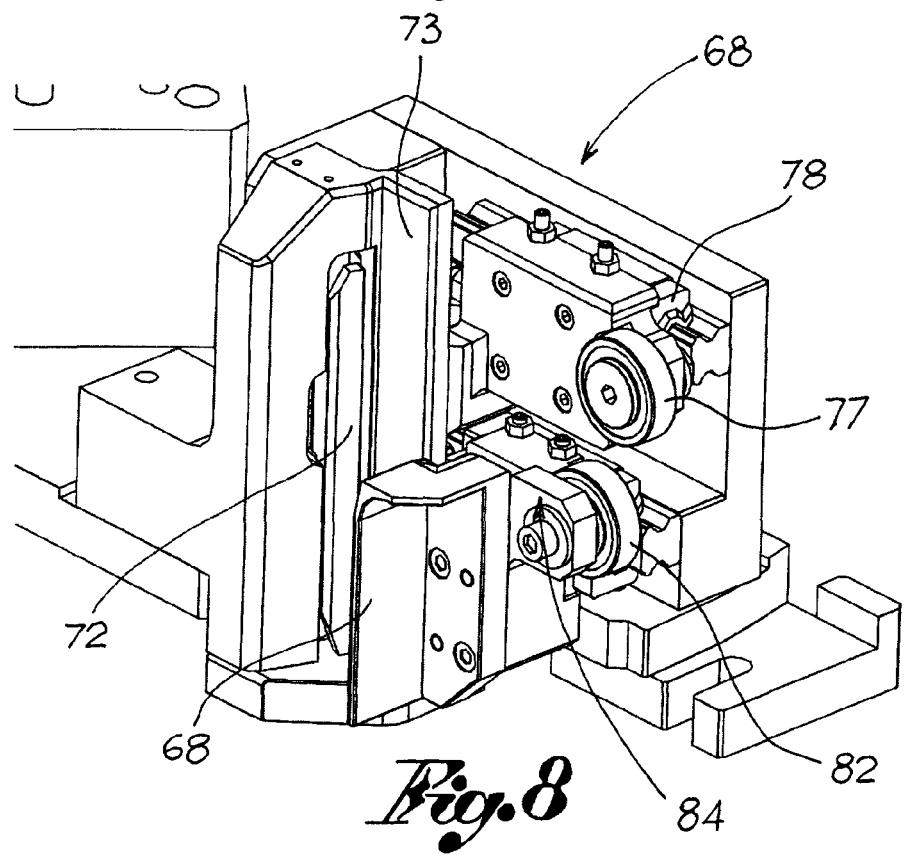

FIGS. 3*a*-3*b* represent front views of the detail III of FIG. 2, in respectively open and closed configurations;

FIG. 4 represents a perspective view of the insertion device and the twisting device of the apparatus according to the present invention;

FIG. 5 represents a side view of the device of FIG. 4, from the side of the arrow V of FIG. 4;

FIG. 6 represents a further view of the insertion and twisting device of FIG. 4, in an open configuration of a guide device;

FIG. 7 represents a plan view of the device of FIG. 6;

FIG. 8 represents a perspective view of the detail VIII of FIG. 6.

The elements or parts of elements in common between the embodiments described below will be indicated with the same numeric references.

With reference to the attached figures, an apparatus is indicated overall with 4 for the insertion of preformed electrical bar conductors 8 in a twisting device of the same.

The electrical bar conductors 8 can have rectangular, flat or square cross section.

For the purposes of the present description, by preforming it is intended the working operation of a linear bar conductor for obtaining a conductor having a "P"-shaped or "U"-shaped form. As is known, such operation can be preceded by other preforming operations, such as straightening for unwinding conductors from a coil, peeling selected regions of the conductor and cutting. All of the aforesaid operations are called preforming since they represent operations for prearranging a bar conductor before the subsequent forming operation, or twisting. As already explained in the introduction of the present document, this essentially consists of a divarication, to which such conductor is subjected before it can be inserted in a core, in a manner such that the two arms of the "P" and of the "U" can be inserted in radially offset pockets of the stator core or rotor core.

For the purposes of the present description, by "flat" or "square" bar conductor, it is intended a bar conductor having substantially flat sides, each joined to adjacent sides, typically by a rounded corner.

Therefore, the words "flat" or "square" or equivalent words used for describing the cross section of a bar conductor, are used in a general sense and must not be interpreted to exclude the fact that such electrical bar conductors have significantly rounded corners which join the substantially flat sides. The expression "flat conductor" should be intended in the sense that the conductor has two opposite sides whose distance is greater than the distance between the remaining two opposite sides. For the purposes of the present invention, the expression "rectangular conductor" should be intended as a generalization of a flat conductor and square conductor, the square being a special rectangular conductor case in which the four sides have the same size.

In any case, the present description can be applied to any bar conductor type, even one having for example circular section.

The bar conductor is for example a conductor comprising a copper core and an insulating enamel coating.

The insertion apparatus 4 of the present invention can either be an independent machine or a work station of a plant for making a component of an electric machine, such as a stator or a rotor.

For example, the insertion apparatus 4 represents the subsequent stage of a preforming machine, as a non-limiting example like that described in the patent application PCT/IT2010/000160.

The insertion apparatus 4 is adapted to insert preformed electrical bar conductors 8 in an associable twisting device 12 of the preformed conductors 8.

The preformed conductors 8 comprise a pair of substantially rectilinear arms 16 connected together by a curved portion 20.

The rectilinear arms 16 can be parallel to each other in a manner such that the conductor assumes a 'U'-shaped configuration or they can have, near the curved portion, a recess in a manner such that the conductor assumes an overall 'P'-shaped configuration.

The twisting device 12 is a device of known type, for example described in US2009178270, adapted to divaricate arms 16 between their free ends 22, said free ends 22 being opposite the curved portion 20.

The twisting device 12 provides for a plurality of pockets 24 adapted to house and divaricate the arms 16 of the conductors 8.

The insertion apparatus 4, as described below, also comprises a supply device 28 of preformed electrical bar conductors 8, arranged according to a supply direction X-X, preferably horizontal (FIG. 3). It also comprises a transfer device 32 which draws the conductors 8 from the supply device 28 into a grip position in which the conductors 8 are arranged along said supply direction X-X and rotates them 90° into an insertion position in which the conductors 8 are arranged according to an insertion direction Y-Y, perpendicular to said supply direction X-X.

In addition, the insertion apparatus 4 comprises an insertion device 36 of the conductor 8 in the associable twisting device 12, equipped with thrust means 40 which translate the conductor 8 along the insertion direction Y-Y until it is at least partially inserted into the pockets 24, on the side of the free ends 22 of the arms 16.

Below, the supply 28, transfer 32 and insertion 36 devices of the insertion apparatus of the present description will be described in more detail.

In particular, the supply device 28 comprises at least two walls 44 that can be opened and closed in a manner such that a housing chamber of the preformed conductor 8 is delimited. In closed configuration (FIG. 3b), said walls 44 house the preformed conductor 8 in a manner so as to have the curved portion 20 facing towards the transfer device 32. In closed configuration, the conductor 8 is situated housed inside the walls 44, and arranged parallel to the supply direction X-X, while the curved portion 20 is preferably outside the walls 44 and is directly facing the transfer device 32 in a manner so as to allow the gripping of the conductor 8 by the transfer device when the walls 44 are still in closed configuration.

In open configuration (FIG. 3a), said walls 44 are opened in a manner so as to free a transfer volume suitable for allowing the rotation of the conductor 8 from the grip position, in which it is arranged parallel to the supply direction X-X, to the insertion position, in which it is arranged parallel to the insertion direction Y-Y.

According to one embodiment, at least one of said walls 44 is openable according to an opening motion that is rotary with respect to a rotation axis W-W parallel to the supply direction X-X.

According to a further embodiment, at least one of said walls 44 is openable according to an opening motion that is translational with respect to an opening direction parallel to the transfer direction Y-Y.

The transfer device 32 draws the conductors 8 from the supply device 28 into a grip position in which the conductors 8 are arranged along the supply direction X-X, and it rotates them 90 degrees into an insertion position in which they are arranged according to an insertion direction Y-Y, perpendicular to said supply direction (X-X) and parallel to the pockets 24 of an associable twisting device 12 of the conductors 8.

According to one embodiment, the transfer device 32 is rotatably supported along a rotation axis Z-Z perpendicular to the supply direction X-X and to the insertion direction Y-Y.

The transfer device 32 comprises at least one grip clamp 48 equipped with a pair of jaws 50 adapted to grasp the preformed conductor 8 from the supply device 28, at said curved portion 20, in a manner such that the arms 16 of the conductor 8 are free for the subsequent insertion in the associable twisting device 12.

According to one embodiment, the transfer device 32 comprises at least two grip clamps 48 angularly offset from each other by 90 degrees with respect to the rotation axis Z-Z of the device itself.

According to the preferred embodiment, the transfer device 32 comprises four grip clamps 48 angularly offset from each other by 90 degrees with respect to the rotation axis Z-Z of the device itself.

For example, the transfer device 32 is operatively connected to motor means, such as a mechanical indexing plate, adapted to rotate the device itself by 90 degree angles, in a manner such that with each rotation, a conductor 8 passes from the grip position to the insertion position.

The transfer device 32 interacts with the insertion device 36, which receives the conductor from the transfer device 32 and inserts it into the pockets 24 of the associable twisting device 12.

According to one embodiment, the thrust means 40 of the insertion device 36 comprise a blade pusher 56, axially movable along the insertion direction Y-Y, the blade pusher 56 being aligned with the conductor 8 in the insertion position in a manner so as to intercept the curved portion 20 of the conductor and to push the arms 16 into the pockets 24 of the associable twisting device 12.

The blade pusher 56 comprises a fixed guide 60, parallel to the insertion direction Y-Y, said fixed guide 60 housing the blade pusher 56 in a manner so as to guide the insertion motion thereof.

Preferably, the blade pusher 56 is aligned with the jaws 50 of the grip clamp 48, when the latter is situated in the insertion position. In particular, said pusher 56 is centered with respect to the air space identified by the jaws 50 during the gripping of the conductor 8, in a manner such that it can be at least partially inserted between the jaws 50 to come into contact with the curved portion 20 if the conductor 8 while this is still seized by the jaws 50, or alternatively right after the opening of the jaws 50.

According to one embodiment, the insertion device 36 comprises a movable guide 68 arranged in a manner so as to intercept the conductor 8 in its insertion motion, in order to facilitate the alignment of the arms 16 with the pockets 24 of the associable twisting device 12 and to facilitate the entrance of the free ends 22 of the arms 16 in said pockets 24.

According to one embodiment, said movable guide 68 comprises a first movable dividing wall 72, adapted to be oriented parallel to an opposite fixed guide wall 73 of the movable guide 68.

Preferably, the first movable dividing wall 72 is driven in rotation by a cam 76 operatively connected to the insertion motion of the pusher 56, in a manner such that it is arranged parallel to the opposite fixed guide wall 73 once the preformed conductor has been rotated into the insertion position by the transfer device 32.

For example, the cam 76 is integral in translation with the blade pusher 56 and interacts with a first small wheel 77 which intercepts the translation motion of the cam 76. The first small wheel 77 is operatively connected to a first slide 78 which can translate perpendicular to the insertion direction Y-Y.

Under the thrust action of the cam 76, the first small wheel 77 is rotated, in a manner so as to not oppose the advancing motion of the cam 76 and thus of the blade pusher 56, and the first slide 78 translates away from the cam 76. In its translation motion, the first slide 78 also drives the first movable dividing wall 72.

The movable guide 68 preferably comprises a second movable dividing wall 80 adapted to affect the arms 16 during closing, so as to make such arms parallel for the purpose of facilitating their insertion in the pockets 24 of the associable twisting device 12.

Preferably, the second movable dividing wall 80 is driven in translation by the cam 76 operatively connected to the insertion motion of the pusher 56, in a manner so as to make the arms 16 parallel close to the entrance of the pockets 24 of the associable twisting device 12.

The cam 76 interacts with a second small wheel 82 which intercepts the translation motion of the cam 76. The second small wheel 82 is operatively connected to a second slide 84 which can translate perpendicular to the insertion direction Y-Y.

Under the thrust action of the cam 76, the second small wheel 82 is rotated, in a manner so as not to oppose the advancing motion of the cam 76 and hence of the blade pusher 56, and the second slide 84 translates away from the cam 76. In its translation motion, the second slide 84 also drives the second movable dividing wall 80.

The method of insertion will now be described of a preformed conductor in a twisting device, in accordance with the present description.

In particular, at least one preformed conductor 8 is supplied to the supply device 28 of preformed electrical bar conductors 8, in a manner so as to arrange the conductor 8 according to the supply direction X-X, having the curved portion 20 facing towards the transfer device 32.

The conductor 8 is grasped, by means of the grip clamp 48 of the transfer device 32, at the curved portion 20, and the supply device 28 is at least partially opened.

The opening of the walls 44 of the supply device 28 occurs after the conductor has already been grasped by the grip clamp 48.

Then, the grip clamp 48 is rotated 90 degrees and the related conductor 8 grasped in a manner so as to arrange the conductor 8 along the insertion direction Y-Y, perpendicular to said supply direction X-X and parallel to the pockets 24 of the associable twisting device 12.

Following the 90° rotation, the previously grasped conductor is brought into insertion position, while a further grip clamp is positioned at the mouth of the supply device 28 in a manner so as to grasp a further conductor 8.

After having brought the conductor 8 into insertion position, the insertion device 36 is actuated; this translates the conductor 8 into the associable twisting device 12, along the insertion direction Y-Y until it is at least partially inserted in the pockets 24.

In particular, the blade pusher 56 is placed in contact with the curved portion 20 of the conductor 8, in a manner such that it is at least partially inserted between the jaws 50 of the grip clamp 48; then, the jaws are opened for allowing the translation of the conductor 8 towards the twisting device 12.

Such translation is guided, along the insertion direction Y-Y, both by means of the fixed guide, which interacts with the blade pusher 56, and by means of the movable guide which interacts directly with the conductor 8 so as to direct the free ends 22 of the arms 16 towards the pockets 24 of the twisting device 12.

The driving of the movable guide 68 occurs due to the cam 76 during the insertion motion of the insertion device.

As can be appreciated from that described above, the apparatus and the method of insertion according to the present invention allow overcoming the drawbacks presented in the prior art.

Indeed, it is possible to arrange the insertion device in series with preforming devices which work by always maintaining the conductor along the same supply direction. In this manner, all the preforming steps of the bar conductor are optimized.

In addition, the apparatus according to the present description allows drawing the conductors and rotating them for the subsequent insertion in the pockets of the twisting device in a quick and efficient manner.

Such operation can in fact be carried out at every quarter turn of the transfer device, which is capable of drawing a first conductor from a supply device and inserting a second conductor in the twisting device at the same time.

The insertion operation of the conductor in the pockets of the twisting device is quick and reliable due to the presence of guides, both of the insertion device and of the arms of the conductor, so as to accompany the arms into the relative seats of the twisting device in a guided manner.

All of the steps of drawing, transfer and insertion of the conductor in the twisting device occur in a guided manner, without ever releasing the conductor until the latter has been inserted into the pockets of the twisting device.

In this manner, one avoids the risk of jamming the apparatus and one ensures a drawing, transfer and insertion of the conductor that is quick and reliable.

A man skilled in the art, for the purpose of meeting contingent and specific needs, will be able to make numerous modifications and variants to the above-described apparatuses and methods, all moreover contained in the scope of the invention as defined by the following claims.

The invention claimed is:

1. An apparatus adapted for inserting a preformed electrical bar conductor into a twisting device of the conductor, the apparatus comprising:
   a supply device that arranges the preformed bar conductor into a supply direction (X-X), the preformed bar conductor having two rectilinear arms that are parallel to each other and connected to each other by a curved portion;

a transfer device that draws the conductor from the supply device into a grip position in which the conductor is arranged along the supply direction (X-X), and rotates it 90 degrees into an insertion position in which the conductor is arranged along an insertion direction (Y-Y), perpendicular to the supply direction (X-X) and parallel to a pocket on the twisting device; and an insertion device that inserts the conductor into the twisting device, the insertion device equipped with thrust means that move the conductor along the insertion direction (Y-Y) until the conductor is at least partially inserted in the pocket.

2. An apparatus according to claim 1, wherein the transfer device is rotatably supported along a rotation axis (Z-Z) perpendicular to the supply direction (X-X) and the insertion direction (Y-Y).

3. An apparatus according to claim 1, wherein the transfer device comprises at least one grip clamp equipped with a pair of jaws adapted to grasp the conductor from the supply device at the curved portion, in a manner such that the arms of the conductor are free for the subsequent insertion into the twisting device.

4. An apparatus according to claim 3, wherein the transfer device comprises at least two grip clamps angularly offset from each other by 90 degrees with respect to the rotation axis (Z-Z) of the device itself.

5. An apparatus according to claim 4, wherein the transfer device comprises four grip clamps angularly offset from each other by 90 degrees with respect to the rotation axis (Z-Z) of the device itself.

6. An apparatus according to claim 1, wherein the transfer device is operatively connected to motor means adapted to rotate the device itself by 90 degree angles, in a manner such that with each rotation, the at least one conductor passes from the grip position to the insertion position.

7. An apparatus according to claim 3, wherein the supply device comprises at least two walls that can be opened and closed in a manner so as to delimit a housing chamber of the preformed bar conductor, wherein when closed the walls house the preformed bar conductor in a manner such that the curved portion faces towards the transfer device, and wherein when open the walls are opened so as to free a transfer volume suitable for allowing the rotation of the conductor and the relative grip clamp from the grip position along the supply direction (X-X), to the insertion position along the insertion direction (Y-Y).

8. An apparatus according to claim 7, wherein at least one of the walls is openable according to an opening motion that is rotary with respect to a rotation axis (W-W) parallel to the supply direction (X-X).

9. An apparatus according to claim 7, wherein at least one of the walls is openable according to an opening motion that is translational with respect to an opening direction parallel to the transfer direction (Y-Y).

10. An apparatus according to claim 1, wherein the insertion device comprises a blade pusher axially movable along the insertion direction (Y-Y), the blade pusher being aligned with the conductor in the insertion position in a manner so as to intercept the curved portion of the conductor and to push the arms into the pockets of the twisting device.

11. An apparatus according to claim 10, wherein the blade pusher comprises a fixed guide parallel to the insertion direction (Y-Y), the fixed guide at least partially housing the blade pusher in a manner so as to guide the insertion motion thereof.

12. An apparatus according to claim 11, wherein the insertion device comprises a movable guide arranged in a manner so as to intercept the conductor in its insertion motion and facilitate the alignment of the arms with the pockets of the twisting device and to facilitate the entrance of the arms in the pockets.

13. An apparatus according to claim 12, wherein the movable guide comprises a first movable dividing wall adapted to be arranged parallel to a fixed guide wall.

14. An apparatus according to claim 13, wherein the first movable dividing wall is driven in rotation by a cam operatively connected to the insertion motion of the blade pusher.

15. An apparatus according to claim 12, wherein the movable guide comprises a second movable dividing wall adapted to affect the arms of the conductor during closing.

16. An apparatus according to claim 15, wherein the second movable dividing wall is driven in translation by a cam operatively connected to the insertion motion of the blade pusher.

* * * * *